(12) United States Patent
Iizuka

(10) Patent No.: US 6,246,880 B1
(45) Date of Patent: Jun. 12, 2001

(54) DETERMINING SUBSCRIBER DEMANDS ON A COMMUNICATIONS SYSTEM

(75) Inventor: Norio Iizuka, Stockholm (SE)

(73) Assignee: Telefonaktiebolaget LM Ericsson (publ) (SE)

( * ) Notice: Subject to any disclaimer, the term of this patent is extended or adjusted under 35 U.S.C. 154(b) by 0 days.

(21) Appl. No.: 09/191,495

(22) Filed: Nov. 13, 1998

(51) Int. Cl.[7] ................................................ H04B 17/00
(52) U.S. Cl. ...................... 455/446; 455/422; 455/450; 455/67.1
(58) Field of Search ............................... 455/62, 63, 67.1, 455/450, 451, 452, 517, 453, 446, 422

(56) References Cited

U.S. PATENT DOCUMENTS

| | | | |
|---|---|---|---|
| 5,475,868 | 12/1995 | Duque-Anton et al. ............... | 455/62 |
| 5,507,007 | * 4/1996 | Gunmar et al. ...................... | 455/447 |
| 5,678,178 | * 10/1997 | Tahkokorpi ........................... | 455/452 |
| 5,710,758 | 1/1998 | Soliman et al. ...................... | 370/241 |

FOREIGN PATENT DOCUMENTS

| | | |
|---|---|---|
| WO 90/10342 | 9/1990 | (WO) . |
| WO 97 01941 | 1/1997 | (WO) . |

OTHER PUBLICATIONS

*Traffic Engineering and Realistic Network Capacity in Cellular Radio Networks with Inhomogeneous Traffic Distribution* by Alfred Baier and Karin Bandelow, XP–000736714; 1997 IEEE 47th, Vehicular Technology Conference, Phoenix, May 4–7, 1997; vol. 2, No. Conf. 47, May 4, 1997, pp. 780–784.

*Traffic Intensity Calculation and Analysis in a Planning Tool for Mobile Networks* by T.A. Smit, M.J. van der Werf and H. Witberg, XP000458665; Proceedings of the Nordic Seminar on Digital Mobile Radio Communications, Helsinki; Dec. 1–3, 1992, Seminar 5, Dec. 1, 1992, pp. 289–293.

Document Standard Search Report for RS 102259 US completed on Jul. 30, 1999, Aug. 3, 1999, EP0.

* cited by examiner

Primary Examiner—Lester G. Kincaid
(74) Attorney, Agent, or Firm—Jenkens & Gilchrist, A Professional Corporation

(57) ABSTRACT

A method and system in a wireless communications system enables a network operator to accommodate subscriber demands by matching resources to current, congested traffic levels and future, predicted traffic levels. The accommodation may be effectuated at the cell level, and the applicable resources include transceivers (TRXs). A given base station in a network records variables on preferably at least three occasions. The variables include time of measurement, mean traffic level (TL), busy hour TL, and current number of TRXs. These four variables may then be used in a non-linear optimization formula applied to a growth equation. Three vital coefficients are produced for the equation. Future traffic levels, as well as a maximum expected subscriber population, for the given cell can be estimated from the growth equation with the vital coefficients. A possible busy hour TL and the predicted future TLs may be used to determine an optimized number of TRXs.

24 Claims, 7 Drawing Sheets

| ENTRY | TIME | MEAN TL | BHTL | NTRX |
|---|---|---|---|---|
| (1) | Month 1 | 3.4 | 10.5 | 5 |
| (2) | Month 3 | 3.6 | 11.3 | 5 |
| (3) | Month 7 | 4.1 | 11.4 | 5 |
| ⋮ | ⋮ | ⋮ | ⋮ | ⋮ |
| (n) | Month _ | --- | --- | --- |

DETERMINING SUBSCRIBER DEMANDS ON A COMMUNICATIONS SYSTEM

BACKGROUND OF THE INVENTION

1. Technical Field of the Invention

The present invention relates in general to the telecommunications field, and in particular, to a method and system for (i) determining or estimating present traffic levels and for predicting future traffic levels in wireless communications systems and (ii) optionally increasing the resources thereof in response to the ascertained traffic levels.

2. Description of Related Art

Wireless communication enables subscribers to place and receive calls from various locations. The increased safety, productivity, and convenience of wireless communication has led to explosive growth across most wireless networks. Meeting the demands of this explosive growth can be difficult and costly. The wireless system is planned well in advance of deployment and is subsequently periodically updated and expanded according to subscriber demands.

Responses to busy traffic levels and growth can include splitting one cell with one base station (BS) into two cells with two BSs. It can also include increasing the resources within a given BS so that the given BS may simultaneously service more subscribers. If expansion of the wireless network fails to precede demand, then potential revenue can be forfeited and, perhaps, relationships with customers may be permanently injured. If, on the other hand, expansion unnecessarily outgrows demand, then capital may be squandered because equipment is prematurely installed and consequently underutilized.

It would therefore be beneficial (e.g., short- and long-term income-maximizing) if wireless service providers could expand their networks concomitantly with busy traffic levels and the predicted growth demands of subscribers. It would be especially advantageous if wireless service providers could expand their networks such that their ability to provide wireless services increases in accordance with increases in busy traffic levels, and just prior to subscriber growth that will consume their expanded ability. Unfortunately, such well-timed expansion usually requires that busy hour traffic levels be ascertained and that subscriber growth be accurately predicted for both an entire wireless communications network and for its individual cells.

In order to predict a future traffic level, conventional techniques employ a simple linear model based on the recorded traffic data in the relevant market. This model is inadequate for meeting the requirements of the operator because it is very difficult to estimate the possible growth function on individual cells. In other words, the forecasting of future traffic levels is inaccurate due to the use of an insufficiently complex mathematical model.

In summary, conventional wireless communications systems have heretofore inadequately accounted for subscriber requirements during peak access periods, and inaccurately predicted future traffic growth. Consequently, wireless service providers have been unable to optimally provide resources to meet subscriber demands.

SUMMARY OF THE INVENTION

The method and system of the present invention optimizes resource allocation within a wireless communications system. The wireless communications system includes an area divided into cells, BSs, at least one mobile services switching center (MSC), and multiple mobile stations (MSs). Some resources in the wireless communications system may be added (e.g., scaled) as subscriber demands grow. These resources may be, for example, associated with the BSs on a cell level or associated with the MSC on a multi-cell level (e.g., based on an amalgamation of subscriber demands among MSC-connected cells). An exemplary resource that may be properly dimensioned using the principles of the present invention is the transceiver (TRX).

In an exemplary embodiment of the present invention, one TRX is assigned per currently-connected subscriber. Accordingly, one TRX is optimally present for each subscriber that requests access to a particular BS, or at least as required to achieve an operator-desired grade of service. In one aspect of the present invention, the number of subscribers that are attempting to access the wireless communications system is estimated based, at least in part, on (i) an average traffic load or level (TL), (ii) the number of access requests that are denied, and/or (iii) empirical evidence.

According to another aspect of the present invention, a future traffic level is predicted using a growth equation and statistical observations. In a first method, a simple exponential growth model is applied to observations, each of which may include a time of entry and a corresponding TL. In a second method, a non-linear optimization model is applied to multiple observations in which each observation entry may include a time of entry, a mean TL, a busy hour TL, and a number of TRXs. At least three such observed entries are preferably incorporated into the unique solution of the growth equation for each given cell in question. The principle of least squares and an iterative Newton-Rapson process is applied to the unique solution after incorporation of the observed entries. Three vital coefficients of the growth equation are thereby determined. The growth equation may then be used to predict future traffic levels at selected times.

According to yet another aspect of the present invention, resources are optimally allocated in response to the estimated congested TLs and the predicted future TLs. Thus, TRXs may be dimensioned within a given cell so that congested TLs are accommodated. Also, TRXs may be dimensioned (prior to actual subscriber demand) so that future TLs may be accommodated before subscriber growth causes any congestion.

An important technical advantage of the present invention is that it enables an estimation of a possible traffic level during periods of congestion when all traffic channels are already assigned.

Another important technical advantage of the present invention is that it provides a formulated approach to predicting future traffic levels at the cell level of a wireless communications system.

Yet another important technical advantage of the present invention is the ability to improve radio frequency planning based on the forecasted traffic levels.

Yet another important technical advantage of the present invention is the ability to optimally utilize network resources based on historical traffic data.

The above-described and other features of the present invention are explained in detail hereinafter with reference to the illustrative examples shown in the accompanying drawings. Those skilled in the art will appreciate that the described embodiments are provided for purposes of illustration and understanding and that numerous equivalent embodiments are contemplated herein.

BRIEF DESCRIPTION OF THE DRAWINGS

A more complete understanding of the method and apparatus of the present invention may be had by reference to the following detailed description when taken in conjunction with the accompanying drawings wherein.

DETAILED DESCRIPTION OF THE DRAWINGS

A preferred embodiment of the present invention and its advantages are best understood by referring to FIGS. 1–8 of the drawings, like numerals being used for like and corresponding parts of the various drawings.

Figure 1:
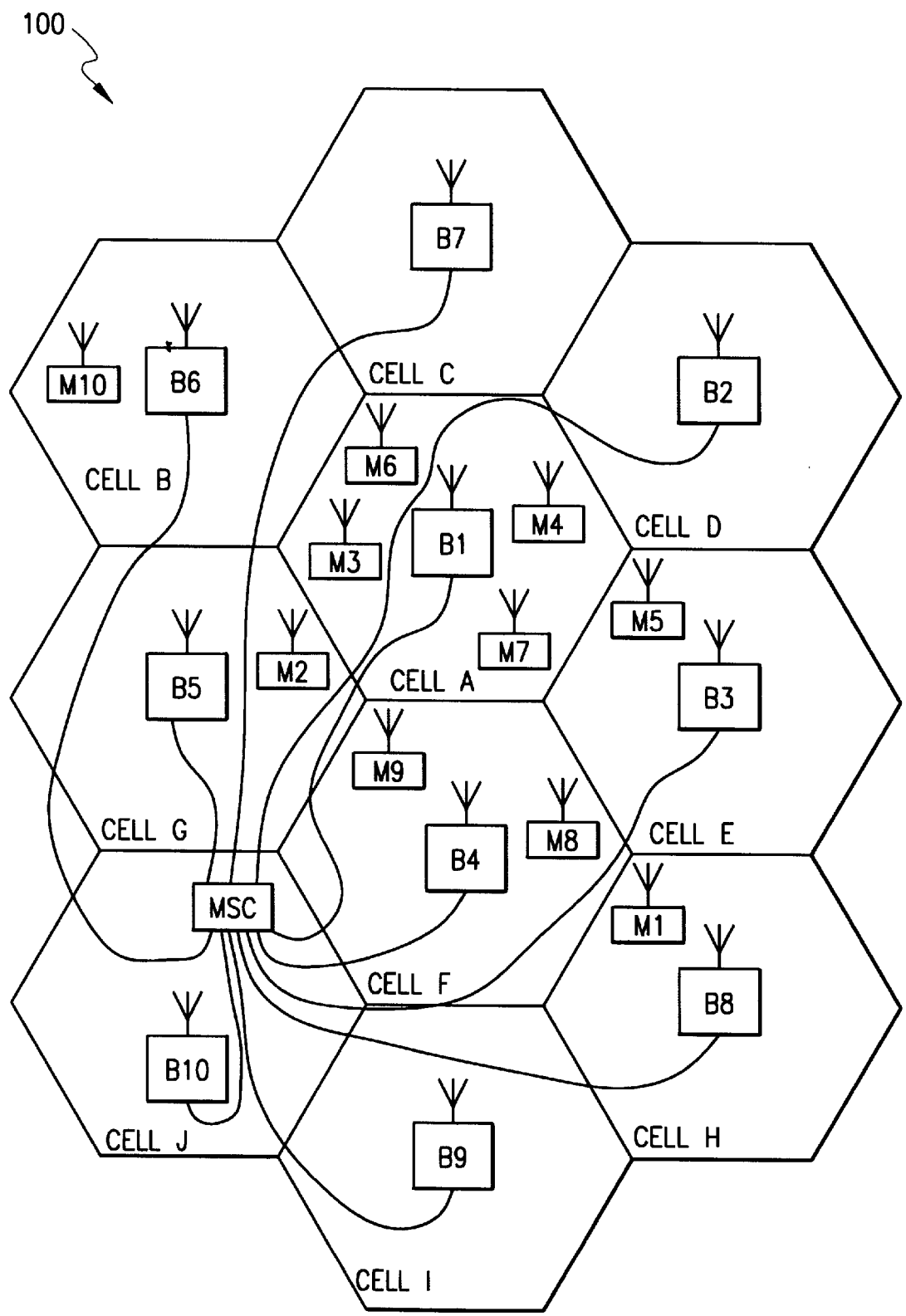
FIG. 1 illustrates ten cells within a wireless communications system of a type in which the present invention may be practiced.

Referring now to FIG. 1, ten cells within a wireless communications system of a type in which the present invention may be practiced are illustrated. In FIG. 1, it is shown that an arbitrary geographic area may be divided into a plurality of contiguous radio coverage areas, namely Cells A–J, jointly designated as a wireless communications system by the numeral 100. While the wireless communications system 100 of FIG. 1 is illustratively shown to include only ten cells, it should be understood that in practice the number of cells can be significantly larger. The principles of the present invention will generally be explained in relation to the Personal Digital Cellular System (PDC) (formerly called the Japanese Digital Cellular System (JDC)) presently fielded in Japan. However, it should be understood that such principles are equally applicable to other systems such as the Global System for Mobile communications (GSM); American Digital Cellular (ADC) systems, in accordance with the IS-95 Standard for example; next-(e.g., third) generation systems, such as Wideband Code Division Multiple Access (WCDMA) or wideband IS-95 (e.g., IS-95+) implementations; satellite communications systems, in which the TRXs are mounted on satellite platforms; etc.

Associated with, and located within each of the Cells A–J, is a BS designated as a corresponding one of a plurality of BSs B1–B10. It should be noted that omnidirectional BSs are exemplary only and that wireless communications systems that employ, e.g., sectorized or directional BSs are equally benefited by the principles of the present invention. A plurality of MSs M1–M10 may also be found within certain ones of the Cells A–J. An MSC of the wireless communications system 100 is illustrated within the Cell J, but the MSC may be located within any of the Cells A–J or entirely outside all of the Cells A–J. The MSC is connected by communication links (e.g., copper or fiber optic cables) to each of the illustrated BSs B1–B10 and to the fixed Public Switched Telephone Network (PSTN) (not shown) or a similar fixed network, which may include an Integrated Services Digital Network (ISDN) facility.

Each of the Cells A–J is allocated a plurality of voice or speech channels (e.g., a traffic channel (TCH)) and at least one control channel (e.g., an analog control channel (ACCH) or digital control channel (DCCH)). The TCHs may also include, by way of example and without limitation, packet data channels for carrying, e.g., speech, pictures, general data/information, video, etc. The control channel is used to control or supervise the operation of MSs by means of information transmitted to and received from those units. Such information may include call originations, page signals, page response signals, location registration signals, and voice channel assignments. A transceiving unit (e.g., a TRX) is normally required for each active TCH communication between a particular BS and an individual MS.

The present invention involves implementation of a method and system for ensuring that TRXs are distributed throughout the existing wireless communications network 100 efficiently. Efficiency is achieved by avoiding high congestion while attaining high TRX utilization. A method and system, which may be at least in part incorporated into wireless network logic, is introduced into the process of cell planning and TRX dimensioning in the wireless communications system 100. TRX dimensioning, in this application, entails providing an appropriate number of TRXs for a BS within a given cell and/or for the entire wireless communications system 100.

While the wireless communications system 100 shows ten MSs M1–M10 distributed throughout the network, it should be understood that the actual number will not only be greater, but the number will also be constantly varying. Particularly within a given cell (such as the Cell A), the number of MSs constantly varies for a myriad of reasons. For instance, the average number of MSs within a particular cell changes over longer periods of time (e.g., months) due to such events as the construction of buildings (e.g., houses, apartments, or offices). Furthermore, the average number of MSs within a particular cell changes over shorter periods of time (e.g., hours) due to typical schedules (e.g., business hours for downtowns, rush hours for highways, etc.). Advantageously, application of the principles of the present invention enables operators of wireless communications systems to recognize such subscriber demands and accommodate them.

Figure 2:
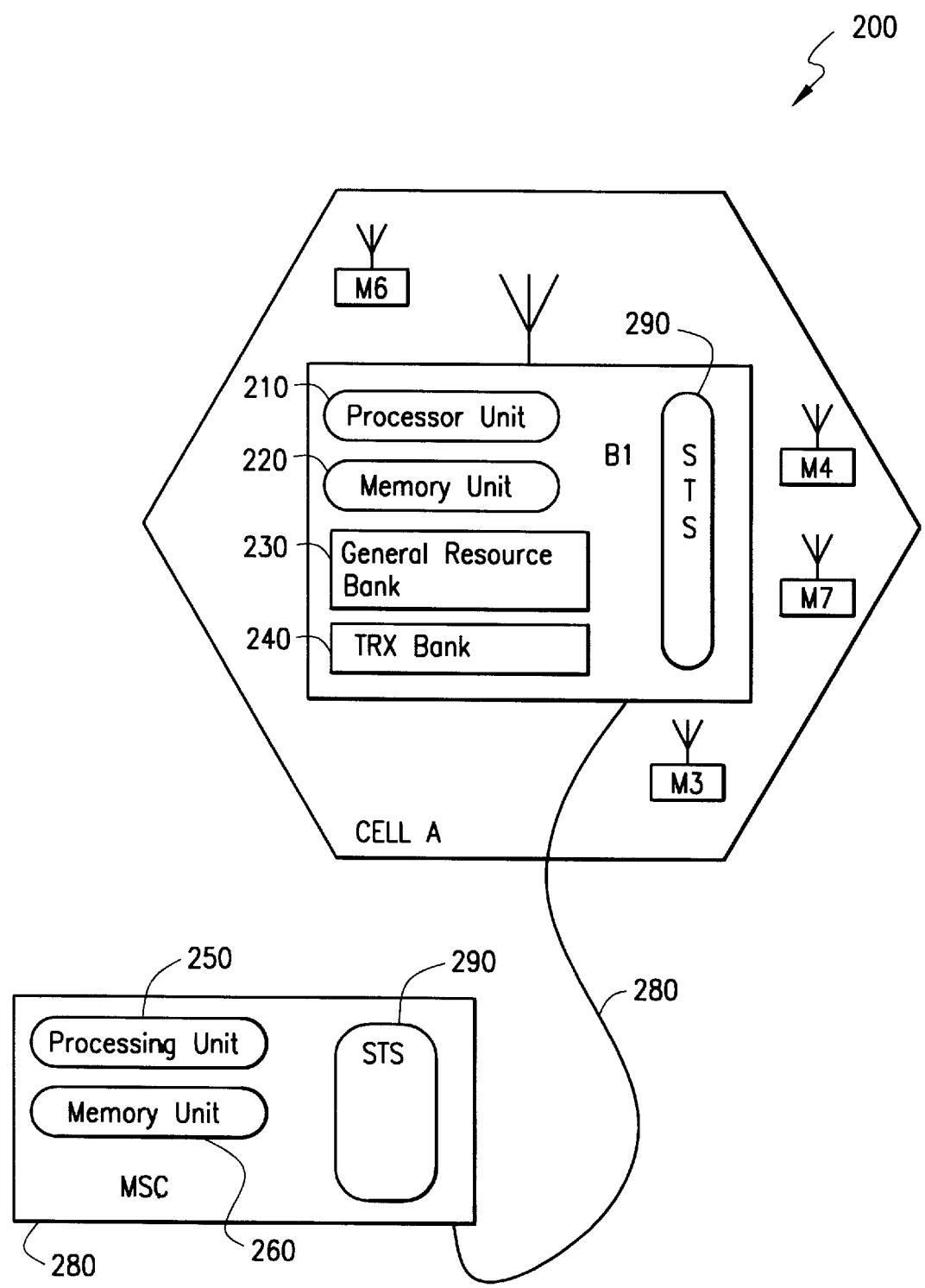
FIG. 2 illustrates an enlarged, more-detailed view of certain portions of the wireless communications system of FIG. 1.

Referring now to FIG. 2, an enlarged, more-detailed view of certain portions of the wireless communications system of FIG. 1 is illustrated. The Cell A and the MSC 270 are designated generally by the element number 200. The Cell A is shown with the MSs M3, M4, M6, and M7 within the Cell A's portion of the wireless communications system 100 (of FIG. 1). The MSs M3, M4, M6, and M7 may be, for example, in active communication with the BS B1 (and thus occupying a TCH) or in the process of acquiring (or attempting to acquire) a TCH. The BS B1 requires certain resources in order to perform its standard functions within the wireless communications system 100.

To accomplish these standard functions (which are known to those of ordinary skill in the art), the BS B1 is provided with certain resources. For example, the BS B1 includes a processor unit 210, a memory unit 220, a general resource bank 230, and a TRX bank 240. By way of example, the TRX bank preferably includes one TRX for each TCH that the operator wishes to be available within the Cell A. Thus, for each TRX within the TRX bank 240, the BS B1 is capable of providing one active communication with an MS. Correspondingly, once the set of TRXs within the TRX bank 240 is depleted, the BS B1 is unable to affirmatively respond to requests from other MSs for a TCH. The other resources of the BS B1 (as represented by the general resource bank 230) may similarly retard the ability of the BS B1 to provide communication services to subscribers when such other resources are depleted.

The BS B1 is shown at 200 as being connected by a communication link 280 to the MSC 270. The MSC 270 also includes many resources in order to accomplish its assigned tasks within the wireless communications system 100. These resources include a processing unit 250 and a memory unit 260. It should be understood that TCH acquisition requests and TCH usage is monitored at the particular BS of a given cell (e.g., the BS B1 of the Cell A) in an exemplary embodiment. The particular BS from among BSs B1–B10 may then report the information to the MSC 270. Accumulation of data and execution of the algorithm according to the principles of the present invention, on the other hand, are performed at the MSC 270 in an exemplary embodiment. However, the accumulation and execution of the present invention may occur at any one of many sites (e.g., a base station controller (BSC), a global MSC (GMSC), an intelligent BS, an off-site or out-of-the-network computer, etc. (none of which are shown)), or the accumulation and execution may alternatively be distributed across several locations.

As alluded to above, network operators are economically benefited by allocating (e.g., purchasing and installing) no more resources than are currently demanded by (and therefore deriving income from) subscribers. Specifically, optimum TRX dimensioning accommodates the short-term variances caused by MS transience while simultaneously preparing for the long-term increases (or decreases) in MS population. As explained above, the traffic loads on cells are constantly changing in both the short-term and the long-term. Thus, poor TRX dimensioning can lead to cells being under-dimensioned or over-dimensioned.

An under-dimensioned cell causes congestion because an insufficient number of TRXs is installed to support the number of TCHs that are simultaneously requested by subscribers. Excessive congestion typically creates end-user dissatisfaction arising from the inaccessibility of the wireless network. An over-dimensioned cell implies that some of the TRXs that are installed are not busy (e.g., the number of TRXs are not efficiently matched to subscriber demands), and operator revenue is adversely impacted (e.g., invested capital is not providing a return). It should be noted that the principles of the present invention are equally applicable to other system components (e.g., those in the MSC) and BS resources (in addition to TRXs), especially those resources that are modular and scalable as subscriber demands increase. Examples of such resources include memory units, processing units, Internet Protocol addresses, etc.

Traffic dimensioning is therefore about correctly dimensioning (especially individual cells of) wireless communications systems to provide a specified grade of service (GOS). A forecast of the optimized number of TRXs needed for the future is the same as that of the estimation of a future traffic load level. To estimate an appropriate number of TRXs in a given cell, sophisticated mathematical optimization logic for the traffic estimation is applied according to an exemplary embodiment of the present invention. The functional relationship between traffic load as measured by Erlang and a number of needed TCH channels has already been computed by a mathematical model, the well-known GOS table. Accordingly, because one TRX element is generally required for each TCH, an estimation of the possible traffic load level (Erlang) shall drive the forecasts for the optimized number of TRXs in the cells. In a preferred embodiment, a nonlinear optimization formula is applied to the measured traffic data.

The estimation of a future traffic level shall be based on the historical traffic trends (e.g., the specific growth characteristics) of individual cells. Advantageously, the present invention accounts for the unique growth tendency of each cell. Unique growth tendency at the cell level has been exhibited by the traffic statistics of wireless network operators. This uniqueness is dependent on subscribers' social behaviors, rural/urban/highway topography, geographical situations, etc. In order to estimate the most appropriate number of TRXs (or amount of any general resource), we must try to find this unique growth function for all individual cells.

The present invention addresses the following (and other) issues related to estimating current, congested traffic levels; to forecasting future traffic loads; and to accommodating such changing subscriber demands by providing appropriate resources such as TRXs. First, a network operator preferably has provisions for recording traffic data for individual cells as well as the entire network. Second, the requisite statistical data is preferably collected by the MSC in conjunction with the particular BS assigned to the given cell. Third, estimations are determined of a mean TL and a possible (e.g., probably actually desired by the current subscriber base) TL in the highly congested cells. Fourth, corrections may be introduced to account for changing cell status. Fifth, a prediction is performed of an expected traffic level in the future. Sixth, resources are acquired and installed to accommodate subscriber demands from either (or both) current congestion and future growth.

According to one aspect of the present invention, average traffic level is calculated and a congested-network traffic level is estimated. Although the present invention will be illustrated in conjunction with the Cell A, the BS B1, and the MSC 270 of element 200, it should be understood that the principles are equally applicable to any cell of the wireless communications system 100.

A statistics and traffic measurement subsystem (STS) 290, preferably co-located at the MSC 270 and the BS B1 performs measuring and data accumulation functions with the aid of the processor unit 210, the memory unit 220, the processing unit 250, and the memory unit 260. A TL (in Erlang) refers to an average of the TL during all measurement times. The TL is preferably estimated using the following formula:

$$TL = \frac{TRALACC}{TRALSCAN} \tag{1}$$

The traffic level is accumulated (TRALACC) by an STS 290 counter that continuously increments recorded traffic levels at intervals of time (e.g., every 10 seconds in an exemplary embodiment). In other words, the current number of allocated TCHs are added to this TRALACC variable at set intervals. The traffic level scan (TRALSCAN) is an STS 290 counter that is incremented each time that the traffic level is recorded (scanned) in a cell. The busy hour traffic load (BHTL) is defined by the same formula as the TL above (equation 1), but the highest traffic density hour during a measurement period is used.

The measured TL of a given cell reflects all requested accesses that have successfully connected to the network.

When the given cell is congested, however, it may not be able to successfully process any new access requests. Consequently, a potential traffic level may be higher than the recorded level. This possible TL may be estimated from the actual TL (calculated from equation 1 above) by the following series of equations.

$$\text{Possible } TL = TL * \left[ 1 + \frac{\text{Number of Congested Access}}{\text{Number of Successful Access}} \right] \quad (2)$$

In equation 2, the "Number of congested Access" represents the number of requests for access to the wireless network that were denied. The "Number of Successful Access" represents the number of requests for access to the wireless network that were approved and received a TCH.

The equation for estimating the possible TL (equation 2) may be rewritten as:

$$= TL * \left[ 1 + \frac{(TRAALLREQ - TRAALLSUC)}{NASSSUC} \right] \quad (3)$$

In equation 3, the "TRAALLREQ" (i.e., a counter in the STS 290 that measures a number of allocation requests for one TCH in a cell) when reduced by the "TRAALLSUC" (i.e., a counter for successful TCH allocation requests) equates to the "Number of Congested Access" variable of equation 2. The NASSSUC represents the number of TCH assignments in which a channel is actually activated while the TRAALLSUC represents the number of TCH allocations in which a channel is not yet activated but the system is attempting to find a non-busy channel. Thus to determine the "Number of Congested Access" variable, the number of all traffic requests and the number of all successful traffic requests are preferably recorded within the wireless communications system 100. Such values are tallied at the BS B1 and then forwarded to the MSC 270 in an exemplary embodiment. The "NASSSUC" (i.e., a counter for successful TCH activations that have been allocated within a given cell) equates to the "Number of Successful Access" variable of equation 2. It should be noted that actual counters are not necessary for implementing the present invention.

Equation 4 results from distributing "TL" across the parenthetical portion of equation 3.

Possible *TL*=*TL*+(Number of Congested Access*Mean Traffic Load Per Call) (4)

The Possible BHTL may be calculated from the Possible TL as shown in equation 5 below.

Possible *BHTL*=(α*Possible *TL*)+σ (5)

where the variable "α" represents a linear coefficient between the TL and the BHTL and the variable "σ" represents a normal magnitude of deviation. Based on data provided in an example that is described below with reference to FIG. 7, the variables are: α=2.4 and σ=5.0. These exemplary values for α and σ have thus been empirically approximated from specific real-world observations. The Possible TL and Possible BHTL variables shall be applied below to the analysis of the forecast of the optimized number of TRXs.

Figure 3:
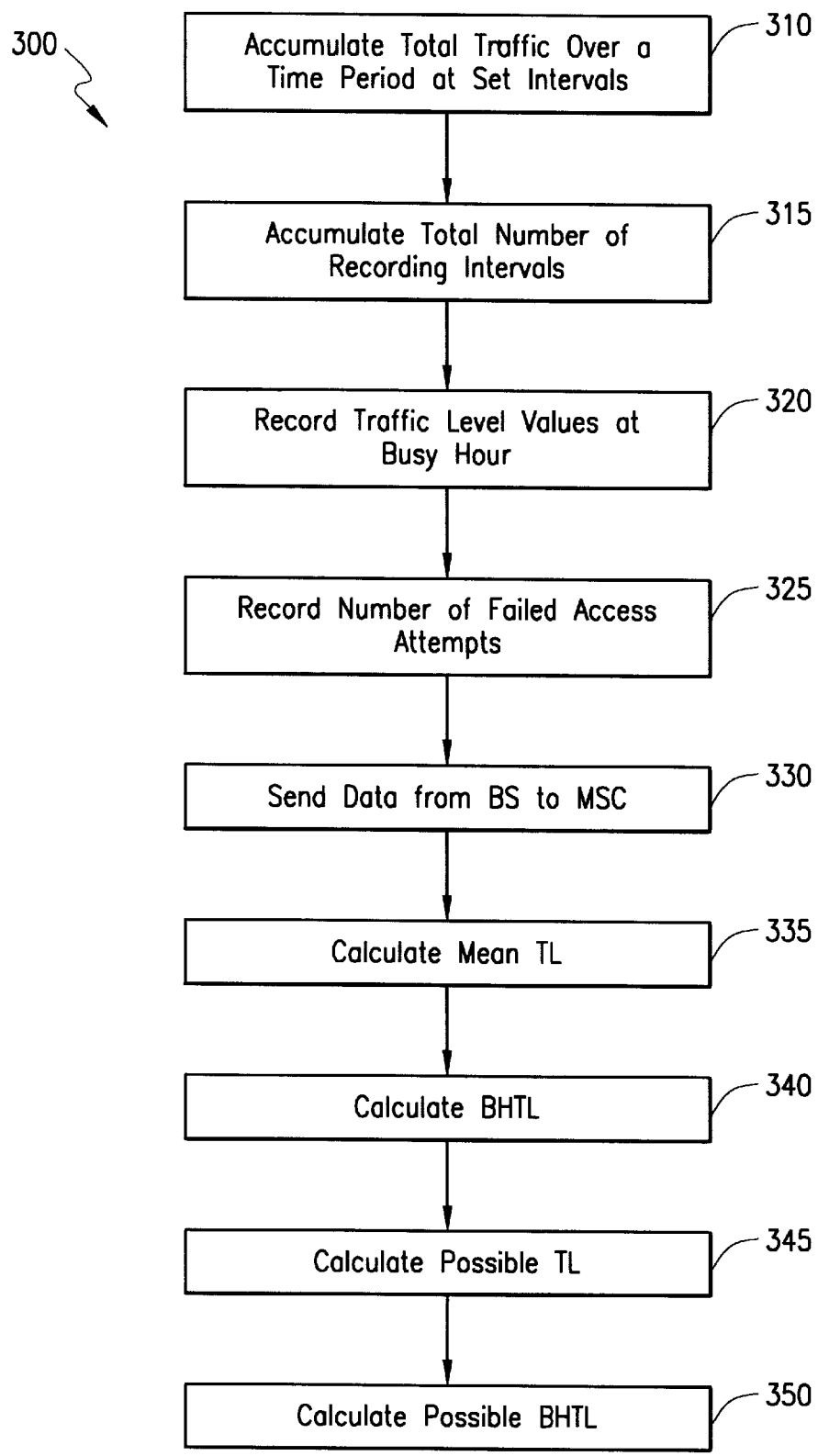
FIG. 3 illustrates a method in flowchart form for determining various traffic level data, including a congested traffic level.

Referring now to FIG. 3, a method in flowchart form for determining various traffic level data is illustrated. The flowchart 300 begins with the accumulation of in-use traffic channels at the BS B1 over a prescribed time period at set intervals (step 310). This step corresponds to the TRALACC variable of equation 1. The BS B1 also accumulates the total number of set recording intervals (step 315). This step corresponds to the TRALSCAN variable of equation 1. The BS B1 also preferably records (e.g., by accumulation over a one hour time period at set intervals) the busy hour TCH usage (step 320). It should be noted that the busy "hour" time period is exemplary only, and other busy time periods (e.g., 30 minutes, 3 hours, etc.) may be used as well.

The relevant data for solving equations 2 and 3 may also be recorded by the BS B1. For example, the number of incidents in which traffic channel requests are refused due to TCH depletion may be recorded (step 325). In an exemplary embodiment, the measured and/or recorded data is then transmitted from the BS B1 to the MSC 270 (step 325). Alternatively, the BS B1 (or other computing device) may perform the calculations and report the results. Once the MSC 270 has received the data, the MSC 270 may calculate the Mean TL (step 335), the BHTL (step 340), the possible TL (step 345), and the possible BHTL (step 350) in accordance with equations 1 through 5.

According to another aspect of the present invention, a growth formula is applied on an individual basis to each cell. The formulated growth model enables the forecasting of the optimum number of TRXs (or other resources) for each cell in the future. The equation below is a modified differential equation for an isolated population. Assuming that $f_0$ is the population at time t=0, then f(t) is the population at time t and satisfies the initial-value problem.

$$\frac{df(t)}{dt} = af(t) - bf^2(t), \quad (6)$$

where t=0 gives $f_0$ as the initial value. The analysis of this population equation is an initial value problem for the given differential equation. The a coefficient is defined as the growth rate coefficient, the b coefficient is defined as the saturation rate coefficient (because the b coefficient term retards unlimited growth in equation 6), and the $f(t=0)=f_0$ is the initial value for the subscriber population, which is related to a determined (e.g., measured and/or estimated, etc.) TL.

According to one principle of the present invention, the growth in traffic events may be modeled based on the population growth dynamics. Population growth in general (as limited by living space, natural resources, etc.) and empirical statistics of subscriber growth are sufficiently similar so that the population growth function is applicable to the prediction of subscriber growth (e.g., subscriber growth, which is related to a determined TL, corresponds to the population growth of the modified Malthusian logic equation in an exemplary embodiment).

The modified Malthusian logic equation (equation 6) can be used, therefore, to predict future subscriber growth (of an isolated population). The differential equation has one analytical solution. With t set equal to 0, $f_0$ is the initial value for the solution. The unique solution of equation 6 is:

$$f(t) = \frac{af_0}{bf_0 + (a - bf_0)e^{-a(t-t_0)}}. \quad (7)$$

This equation 7, as t approaches $\phi$, gives:

$$f(\infty) \to \frac{af_0}{bf_0} = \frac{a}{b}. \tag{8}$$

Consequently, the population always approaches (e.g., converges toward) the limiting value of (a/b) regardless of its initial value. Moreover, it should be noted that f(t) is a monotonically increasing function of time if $0 < f_0 < (a/b)$.

Two principal methods may be used to determine the vital coefficients, i.e., the a, the b, and the $f_0$. The two principal methods are a simple exponential growth model and a non-linear optimization model. With respect to the first method, the simple exponential growth model enables the determination of the vital coefficients, including the initial value of the unique solution (equation 7 being the unique solution of equation 6). The simple exponential growth model does not include a term that retards unlimited growth. The mathematical representation of the simple exponential growth model is:

$$f(t) = f_0 e^{a(t-t_0)} \tag{9}$$

Data from the wireless system is preferably recorded and then applied to the exponential growth model of equation 9. Such data includes (i) a TL (e.g., the total number of subscribers using the wireless system in the relevant area) and (ii) a time period for recording the TL (e.g., an entry number for the recording intervals, which may be weekly or monthly for example).

Thus, for each entry a time t (from 1 to the total number of data points n, where n is greater than 1) is recorded along with a measured TL (Erlang) (e.g., for $level_1$ to $level_n$). Applying the n entries to the exponential model of equation 9, results in a series of n equations: $level_1 = f_0 e^a$ at $t=1$, $level_2 = f_0 e^{2a}$ at $t=2$, $level_3 = f_0 e^{3a}$ at $t=3$, and up to $level_n = f_0 e^{na}$ at $t=n$. After taking the natural logarithm of the equations, the following matrix equation is derived:

$$\begin{vmatrix} 1 & 1 \\ 1 & 2 \\ 1 & 3 \\ \vdots & \vdots \\ 1 & n \end{vmatrix} * \begin{bmatrix} \ln(f_0) \\ a \end{bmatrix} = \begin{bmatrix} \ln(level_1) \\ \ln(level_2) \\ \ln(level_3) \\ \ldots \\ \ln(level_n) \end{bmatrix} \tag{10}$$

Equation 10 corresponds to the vector variable equation A X=B. Using these vector variables, a maximal solution of the over-dimensioned linear matrix equation 10 may therefore be found (e.g., by computer) such that the optimal solution can be expressed as $X = (A^T A)^{-1} (A^T B)$.

After mathematical manipulation, the following optimized vital coefficients are estimated as follows:

$$f_0 = e^{X(1)}, \tag{11}$$

$$a = X(2), \text{ and}$$

$$b = \frac{a}{\text{anticipated Limit of Subscribers}}.$$

In determining the above optimized vital coefficients (from the equations in 11), the variable "X(1)" represents the natural log of the initial value and the variable "X(2)" represents the estimated growth rate. Thus, the anticipated potential market size for our operators may be calculated by using a reasonable value. The reasonable value is constituted by estimating the anticipated maximum limit of subscribers (e.g., GOS X % of (No. of TCHs*Timeslots)). It should be noted that in one embodiment the vector corresponding to the vector variable A is modified by replacing the first through the fourth rows with zeros. This improves the prediction of long term subscriber growth by reducing the a coefficient to a more-reasonable long-term value. Such modification is less beneficial for estimating short-term subscriber growth.

According to the second method to determine the vital coefficients, a non-linear optimization model provides a more-powerful technique to determine the vital coefficients of the unique solution. The unique solution (equation 7) may be rewritten with unknown variables (e.g., the coefficients) as:

$$y(a, b, f_0, t) = \frac{af_0}{bf_0 + (a - bf_0)e^{-a(t-t_0)}}, \tag{12}$$

or as a vector formula:

$$y(x_i, t) = \frac{x_1 x_3}{x_2 x_3 + (x_1 - x_2 x_3)e^{-x_1(t-t_0)}}. \tag{13}$$

Finding the optimal vector $X_i$ in the vector formula (equation 13) provides another solution for the vital coefficients of the unique solution (equation 7). This presents a non-linear optimization problem.

The wireless communications system 100 formulates certain observations from the measured and determined values described above with reference to FIG. 3 and related equations 1–5. The observations are indicated mathematically as follows:

$$y_i = y(x, t_i),$$

i=1, 2, . . . m, and $$x = [x_1, x_2, x_3]. \tag{14}$$

The observations for the equations 14 may be taken by the BS B1 in Cell A and transferred for analysis to the MSC 270. The MSC 270 may then perform the iterative analysis to determine the vital coefficients. The x vector includes three variables: the growth rate ($x_1$), the saturation rate ($x_2$), and the initial value of the traffic growth function ($x_3$). More than three measurements of the TL, the BHTL, and the number of TRXs (NTRX) are preferably recorded and/or measured over time period(s). The time period is a month in an exemplary embodiment, but other time periods may alternatively be used. The time of recording/measuring corresponds to the $t_i$ variable. The m variable represents the number or recordations/measurements that are made before applying the iterative method of the present invention to the determined values and growth equation. In a preferred embodiment, the variable m equals at least three recording/measuring events.

Figures 4, 6:
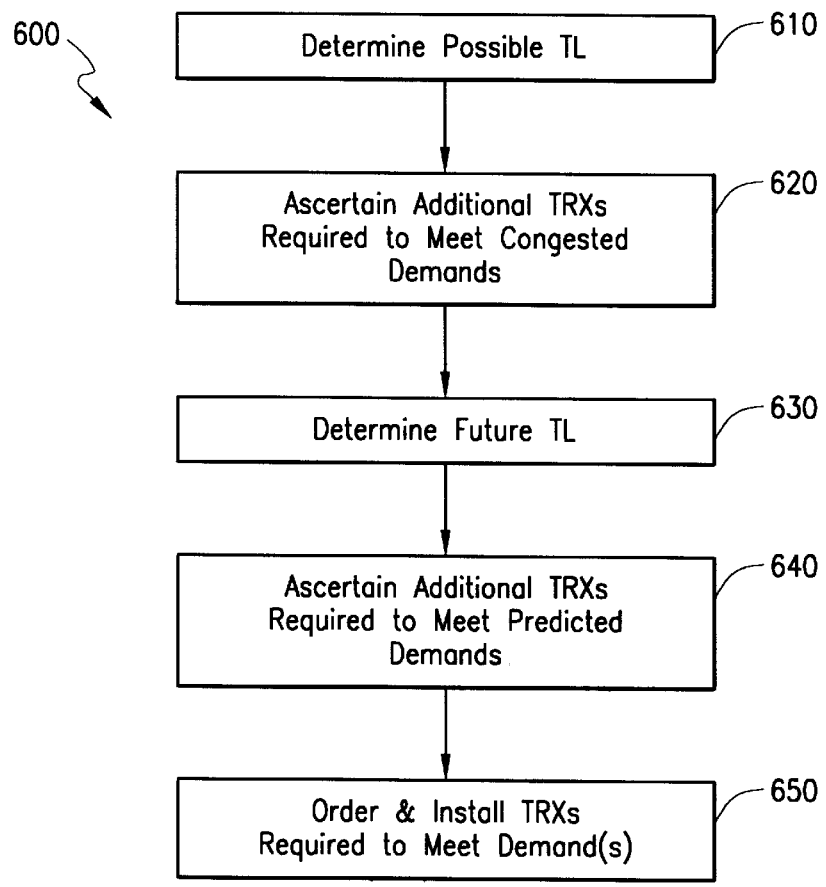
FIG. 4 illustrates a data memory structure of determined traffic level values.
FIG. 6 illustrates a method in flowchart form for accommodating subscriber demands with appropriate resource dimensioning.

Referring now to FIG. 4, a data memory structure of determined traffic level values is illustrated. The data structure 400 may be stored at the location of data calculation, such as at the memory unit 260. However, the data structure 400 may be stored in other memories as well. The data structure 400 exemplifies some of the values collected and calculated according to the principles of the present invention. Although at least three entries 410 preferably exist for the iterative process, any number of entries 410 may be used as indicated by the $n^{th}$ entry 410. The variables include the time of measuring 420 (e.g., months 1, 3, and 7), the mean TL 430 (e.g., 3.4, 3.6, and 4.1), the BHTL 440 (e.g., 10.5, 11.3, and 11.4), and the NTRX 450 (5 TRXs at each measurement stage). It should be noted that other time periods for measuring 420 may be used instead of a month (e.g., a week). These variables are applied in the iterative process to attain the vital coefficients.

If the observations are considered to have equal weight, then the principle of the least squares may be applied to minimize the function:

$$\varphi(x) = \sum_{i=1}^{m} (y(x, t_i) - y_i)^2. \tag{15}$$

This over-determined equation, with many observations, shall be solved using Newton-Rapson's iteration method of the matrix equation as, $$X_{n+1} = X_n - H(X_n)g(X_n) \tag{16}$$

where $$X = \begin{bmatrix} x_1 \\ x_2 \\ x_3 \end{bmatrix} \text{ where } \begin{array}{l} x_1 = a \\ x_2 = b \\ x_3 = f_0. \end{array} \tag{17}$$

$$g(x) = \left[\frac{\partial \varphi}{\partial x_i}\right]^T_{i=1\ldots 3} \tag{18}$$

and in which H(X) is the inverse of the Hassian G(X) of the Jacobian matrix (equation 18).

$$H(X) = G^{-1}(X). \tag{19}$$

The Hassian matrix for equation (16) is defined as:

$$G(X) = \left[\frac{\partial^2 \varphi}{\partial x_i \partial x_j}\right]_{i,j=1\ldots 3} \tag{20}$$

Using the iterative method of the orthodox Newton-Rapson, therefore, good optimized coefficients may be determined for the unique solution (equation 7). Moreover, after finding the coefficient b, the market's (or cell's) unknown potential size (e.g., in terms of TL) may be evaluated. The possible maximal traffic load is equal to $(x_1/x_2)$. While the above equations and formulas (e.g., the iteration formula of equation 16) are complex and require difficult mathematical analysis, the optimal solution of the non-linear equation 15 simultaneously provides a growth rate and a potential market size with (primarily) observed values. It should be noted that if $(x_1/x_2)>$GOS (No. of TCHs*Timeslots), then a cell split is recommended.

Figure 5:
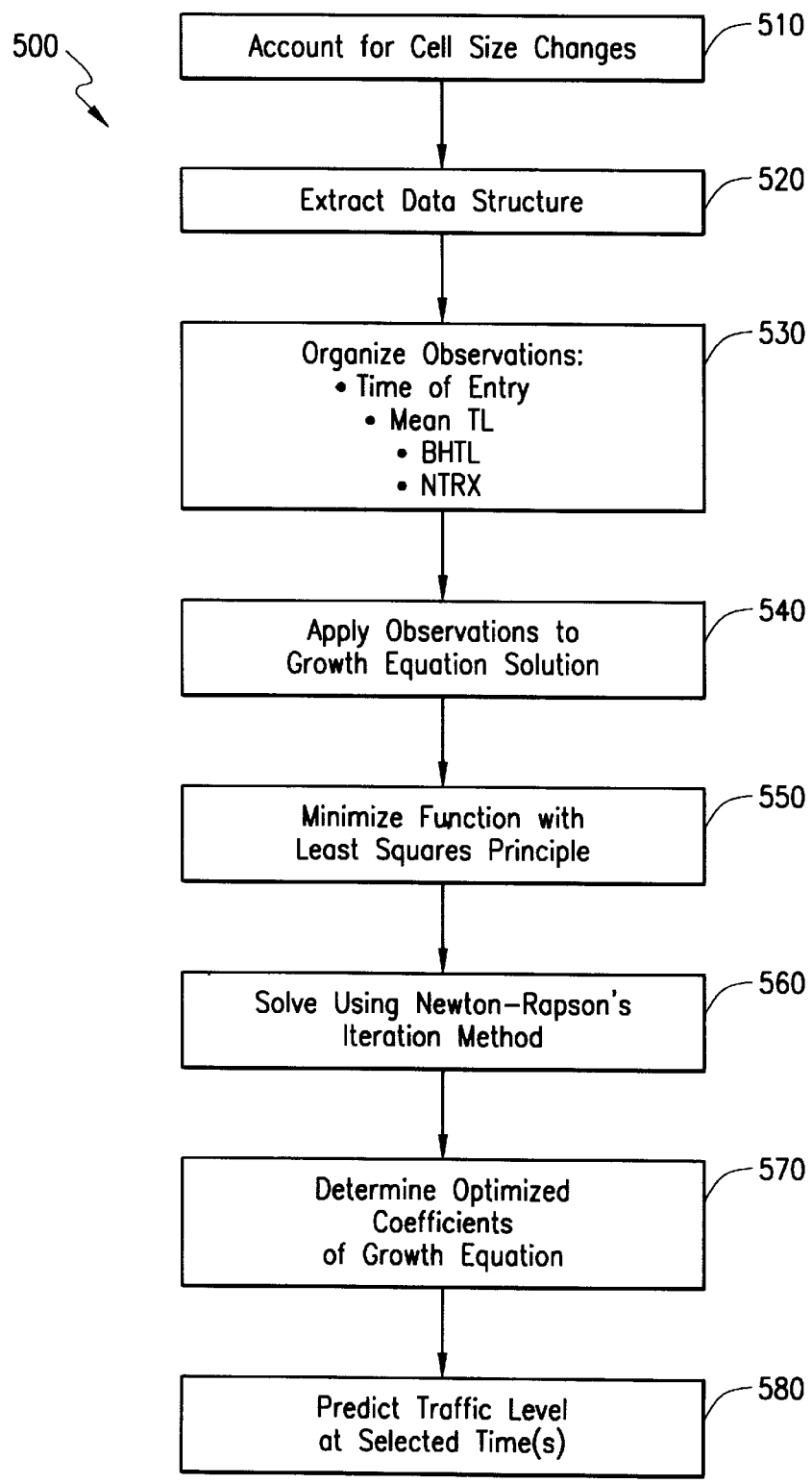
FIG. 5 illustrates a method in flowchart form for predicting future traffic levels.

Referring now to FIG. 5, a method in flowchart form for predicting future traffic levels is illustrated. The flowchart 500 relates to the above-described aspects of the present invention by describing exemplary primary steps of applying a growth formula on an individual basis to each cell. Initially, corrections may be introduced to account for changing cell status (e.g., size) (step 510). For example, a cell split in a wireless network may reduce the future traffic load for adjacent cells. On the other hand, a cell merge in a wireless network may increase the traffic load. Consequently, the forecasting method and system of the present invention includes checks to determine whether there have been pertinent cell splits or cell merges in the wireless network at relevant times (e.g., during or after traffic load measurements).

The data structure 400 may be extracted from the memory unit 260 (step 520). The multiple entries 410 of the observations are organized (step 530). The observations include the time of the entry 420, the mean TL 430, the BHTL 440, and the NTRX 450. The observation entries 410 may then be applied to the growth equation solution (equation 7) (step 540). Assuming the observations are equally weighted, the principle of the least squares is applied to minimize the function that results from the application of the observations (step 550). The function is then preferably solved using Newton-Rapson's iteration method (step 560). The optimized coefficients of the growth equation solution (equation 7) are determined (step 570). The optimized coefficients may be applied to the growth equation solution (equation 7) so that future traffic levels may be predicted at selected time(s) (step 580).

Referring now to FIG. 6, a method in flowchart form for accommodating subscriber demands with appropriate resource dimensioning is illustrated. In accordance with yet another aspect of the present invention, the flowchart 600 explains a process for optimum resource (e.g., TRX) dimensioning. Initially, a possible TL is determined (step 610). The possible TL may be determined in accordance with equations 1 through 4, FIG. 3, and the corresponding text. From the possible TL, the number of additional TRXs needed to meet demands during congested periods is ascertained (step 620). Future TLs may also be determined (step 630). Future TLs may be determined in accordance with equations 6 through 20, FIGS. 4 and 5, and the corresponding text. From future TLs, the number of additional TRXs needed to meet predicted demands is ascertained (step 640). It should be noted that the examples herein are explained in the context of "full rate speech" TCHs, but "half rate speech" TCHs (or other fractions or multiples of a full rate speech or data channel) may be available. In these circumstances, in accordance with the principles of the present invention, the NTRX required determination may be modified according to partial-rate channel availability and desired voice quality/data transmission rates. For example, because "half rate" channels allow more channels per TRX in a given system as compared to "full rate" channels, the NTRX needed may be decreased if "half rate" channels are contemplated and implemented/selected.

Continuing now with FIG. 6, the ascertained numbers of TRXs (which are needed to achieve a desired GOS based on the calculated levels of congested or future TLs) (as determined in step 640) may be ordered and installed to meet the demand(s) (step 650). To meet estimated congestion TL demands, TRXs may be ordered and then installed in response to the calculated possible TL. To meet predicted future TL demands, TRXs may be ordered and installed just prior to the occurrence of the predicted TL growth demands, thus simultaneously improving capital efficiency and subscriber service.

The present invention advantageously provides the following benefits. Using the growth function for any time in the future can produce a forecast of the number of TRXs for each cell. The forecasted number of TRXs may also be applied for radio frequency allocation planning in the wireless network. High utilization of TRXs results in a high capital efficiency rate for the operators. An operator using this method may scientifically design the cell planning and TRX ordering. Consequently, TRX delivery can be more certain, and a vendor's production of TRXs can also be well planned. Three main coefficients (e.g., an initial traffic value, a traffic growth rate, and a saturation rate) of the growth function and a time variable enables the derivation of the values of TLs in the future. These coefficients may be estimated for each individual cell to permit cell-level estimation of congested levels and prediction of future levels.

The present invention as described above entails the following (and other) factors. There is a unique growth function on each cell in the wireless communications system due to geographical aspects of cell sites and end users' social behaviors. The present invention statistically estimates this unique growth function. The growth function is defined as a logistic function that has three different vital coefficients. A Newton-Rapson iterative process is preferably applied to estimate an optimally-valued solution of the vital coefficients. Each entry of the statistical traffic data may include a mean traffic load, a busy hours traffic load, a number of congested (requested but denied) call accesses, and a number of successfully activated TCH channels. The growth function may be used for any time in the future to make a forecast of the appropriate number of TRXs (or other resources) for each cell. At least three such statistical entries of recorded traffic data are preferably used to estimate the growth function of one cell.

Figure 7:
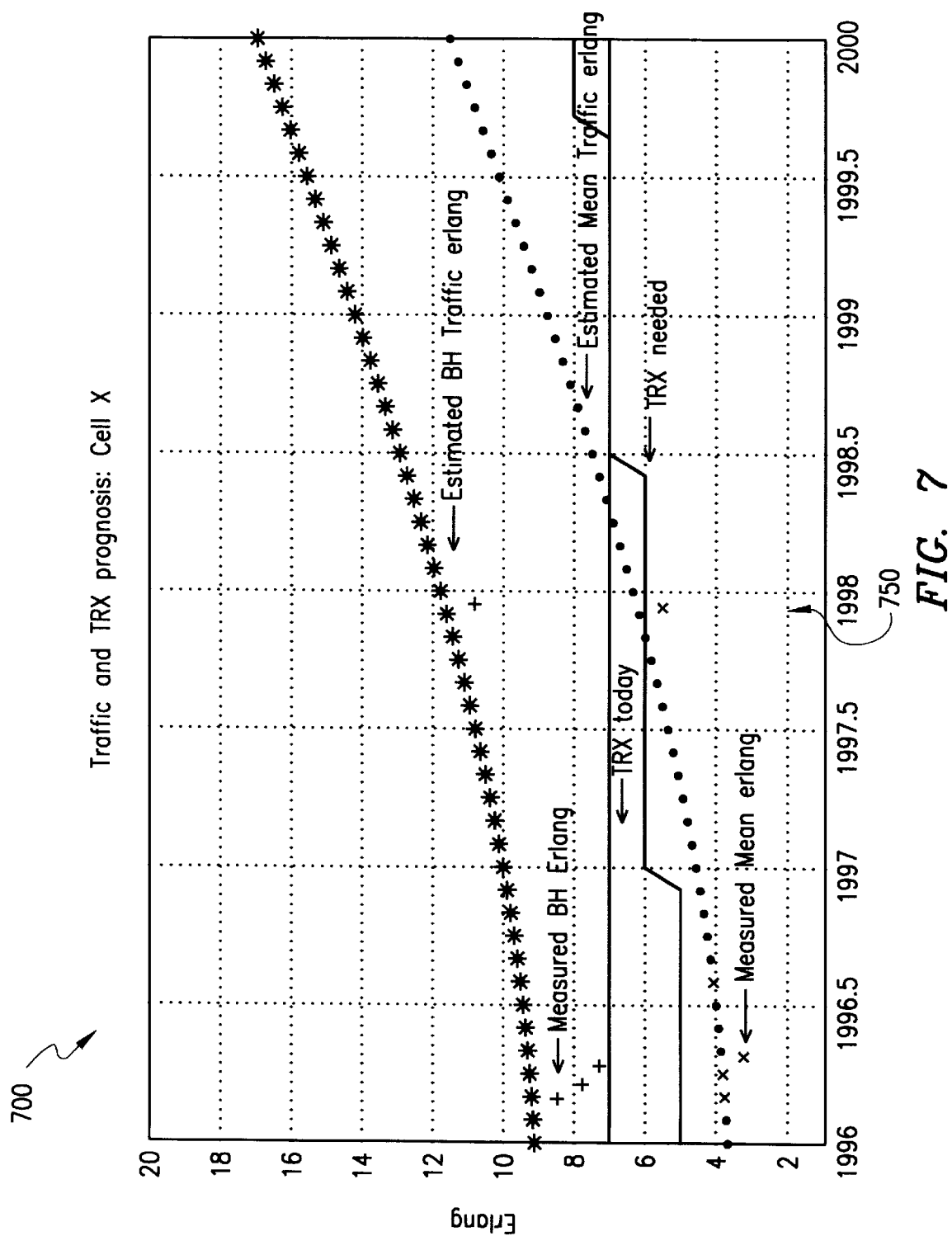
FIG. 7 illustrates in graphical form an exemplary implementation of the estimation of future traffic levels to further illuminate certain principals of the present invention.

Referring now to FIG. 7, an exemplary implementation of the estimation of future traffic levels to further illuminate certain principals of the present invention is illustrated in graphical form. The graph 700 includes plots for traffic and TRX prognosis for an exemplary cell, "Cell X", which may be, for example, a cell within the wireless communications system 100 (of FIG. 1). The time is marked along the abscissa axis in units of one-half year from 1996 to 2000. The ordinate axis is marked in units of "Traffic" Erlang and "NTRX" ranging from 2 to 20. In graph 700, four measured values of TL are marked with an "x" and denoted by "Measured Mean Erlang". Also, four measured values of BHTL are marked with a "+" and denoted by "Measured BH Erlang". Four measured units of time are preferably acquired as well, in conjunction with the measured TL and BHTL. The NTRX are also plotted on the graph 700. In this case, the NTRX is seven and is a constant throughout all relevant times. The NTRX plot is denoted by "TRX today".

By applying novel estimation logic in accordance with the principles of the present invention, the unique growth function f(t) in the "Cell X" may be determined. The measured mean TLs (Erlang) are applied to the above equations 14–20 with each $y_i$ variable receiving a measured TL value. The unique growth function's vital coefficients (a, b, and $f_0$) may then be determined from the measured mean TLs as explained above in connection with, for example, equations 14–20. Using a growth function with the determined values for a, b, and $f_0$ for the "Cell X", the function f(t) may be used to predict future TLs over a given period of time (e.g., until the year 2000 in the graph 700).

After the measured mean TLs have been used to determine the vital coefficients, a 3% GOS may be computed using the well known GOS table. The 3% GOS may be computed using the predicted (estimated) TL Erlang over the time span in question using the BHTL. The estimated BHTL (Erlang) may be determined using, for example, at least one of two techniques. First, the predicted/estimated mean TL from the unique growth function and determined vital coefficients may be added to a maximum value as determined from each BHTL value decreased by the corresponding TL value as measured during the period from the beginning of 1996 to the middle of 1996 as indicated by the multiple "+" symbols on the graph 700. An equation representing the first technique is:

$$\text{Estimated } BHTL \text{ } (Erlang) = \text{Estimated Mean } TL + \max_{1 \le t \le 4} (BHTL - TL)_t, \quad (21)$$

in this example. Second, if no BHTL is measured, then the predicted/estimated BHTL may be determined from the predicted/estimated mean TL times 2.4+5.0 as shown above in equation 5 and described thereat.

The required NTRX may be derived in this example using the 3% column of the GOS table and the estimated BHTL Erlang level. Continuing now with FIG. 7, the current example is further explained by considering November of 1998, which is marked at 750. The mean TL will be determined by referring to the "Estimated Mean Traffic Erlang" curve that is plotted based on the unique growth function and determined vital coefficients. The intersection of November 1998 and this curve is 6.1 Erlang. The intersection of the "Estimated BH Traffic Erlang" curve and November 1998 is 11.8 Erlang. Once the 11.8 Erlang has been determined for the BHTL, the 3% column of the GOS table may be referenced. The number of TCHs that corresponds to 11.8 Erlang at a 3% GOS is 17. Thus, 17 TCHs are required to serve 11.8 Erlang at the desired level of service In a PDC implementation, each TRX provides 3 TCHs. To determine the number of needed TRXs, 17 TCHs should be divided by 3 TCHs per TRX. The result is that 6 TRXs are needed for the "Cell X" in November of 1998. In other systems and/or standards, the number of TCHs provided by a single TRX may be other than 3. For example, each TRX provides 8 TCHs in standard GSM systems.

Continuing now with FIG. 7, it may be determined that in "Cell X" two TRXs more than necessary are installed in July of 1996. This may be determined by comparing the graph of "TRX needed" to the graph of "TRX today". It may further be determined that six TRXs shall be required after December of 1996 and that seven TRXs shall be required after June 1998. Application of the principles of the present invention, therefore, enables proper TRX dimensioning. It may be determined from the graph 700 whether the appropriate number of TRXs are installed, and thus whether resources are properly, if not optimally, allocated within the wireless network system. For example, referring to graph 700, it may be determined that in July of 1997 only six TRXs are sufficient to serve the traffic demands of "Cell X" with a 3% GOS. The wireless network operator may therefore advantageously reallocate one TRX to another cell within the wireless network system.

Figure 8:
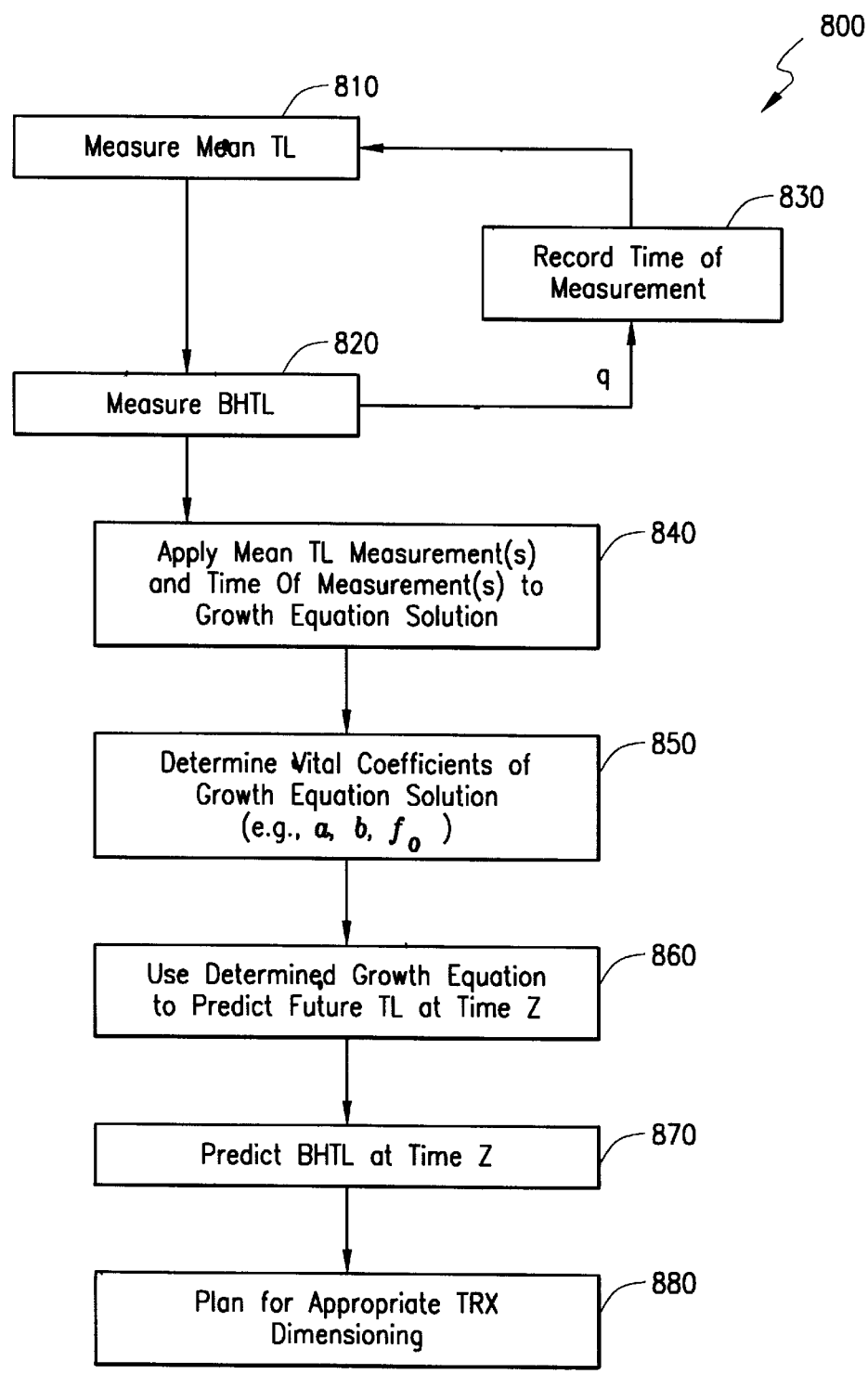
FIG. 8 illustrates another method in flowchart form for accommodating subscriber demands with appropriate resource dimensioning.

Referring now to FIG. 8, another method in flowchart form for accommodating subscriber demands with appropriate resource dimensioning is illustrated. Flowchart 800 shows a method for estimating future TLs and BHTLs, such as that shown in the exemplary implementation of FIG. 7. For each relevant period of time, the mean TL is measured (step 810). During a busiest hour of each relevant period of time, the BHTL is measured (step 820). These measurements are repeated for a desired number of periods of time. The time of measurement is recorded (step 830) as the measuring process is repeated the desired number of times (e.g., as represented by the variable "q"). It should be noted that the NTRX may also optionally be determined during these time periods.

Once these measurements have been repeated "q" times, the mean TL measurements and the time of measurements may be applied to the growth equation solution (equation 7) (step 840). The vital coefficients (e.g., a, b, and $f_o$) of the growth equation solution may then be determined (step 850).

The determined growth equation may be used to predict a future TL at, for example, time Z (step 860). From the predicted future TL, the BHTL may be likewise predicted at time Z (step 870). The BHTL may be predicted using at least one of the two methods as described above. For example, the maximum selected from the difference calculated between the measured BHTL and the corresponding measured mean TL (equation 21) for each time period up to "q" may be added to the predicted future TL at time Z to determine the predicted future BHTL at time Z. Once the predicted BHTL has been determined, the network operator may plan for appropriate resource (e.g., TRX) dimensioning (step 880).

Although a preferred embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A method in a wireless communications system for dimensioning resources in response to congested traffic levels, comprising the steps of:
   determining an average traffic level;
   determining a possible traffic level based on, at least in part, a number of traffic channel request failures;
   ascertaining an amount of a resource, said amount of said resource accommodating said possible traffic level; and
   wherein said step of determining an average traffic level further comprises the steps of:
   accumulating a total traffic channel number over a predetermined time period at set intervals;
   accumulating a total number of said set intervals over said predetermined time period; and
   estimating a mean traffic level responsive to said total traffic channel number and said total number of said set intervals over said predetermined time period.

2. The method according to claim 1, wherein said steps of determining an average traffic level, determining a possible traffic level, and ascertaining an amount of a resource are performed with respect to a cell of said wireless communications system.

3. The method according to claim 1, wherein said resource comprises transceivers.

4. The method according to claim 3, further comprising the step of:
   installing a number of transceivers so that a specified grade of service is provided during periods of congestion, wherein said number of transceivers is based on said amount of said resource that accommodates said possible traffic level.

5. A method in a wireless communications system for dimensioning resources in response to congested traffic levels, comprising the steps of:
   determining an average traffic level;
   determining a possible traffic level based on, at least in part, a number of traffic channel request failures;
   ascertaining an amount of a resource, said amount of said resource accommodating said possible traffic level; and
   wherein said step of determining a possible traffic level further comprises the step of determining said possible traffic level based on, at least in part, said average traffic level, said number of traffic channel request failures, and a mean traffic load per call.

6. A method in a wireless communications system for dimensioning resources in response to congested traffic levels, comprising the steps of:
   determining an average traffic level;
   determining a Possible traffic level based on, at least in part, a number of traffic channel request failures;
   ascertaining an amount of a resource, said amount of said resource accommodating said possible traffic level; and
   further comprising the step of calculating a possible busy hour traffic level according to the following equation:

$$(\alpha^* \text{ said possible traffic level}) + \sigma,$$

where said "$\alpha$" represents a linear coefficient between said average traffic level and a busy hour traffic level, and said "$\sigma$" represents a normal magnitude of deviation.

7. A method in a wireless communications system for predicting future traffic levels, comprising the steps of:
   recording a first time for a first entry;
   determining a first value for said first entry, said first value dependent on a first traffic level;
   recording a second time for a second entry;
   determining a second value for said second entry, said second value dependent on a second traffic level;
   applying said first time, said first value, said second time, and said second value to an equation related to a growth model;
   determining at least one coefficient of said equation; and
   predicting a future traffic level at a selected time using said equation with said at least one coefficient.

8. The method according to claim 7, further comprising the step of:
   ascertaining an amount of a resource, said amount of said resource accommodating said future traffic level.

9. The method according to claim 8, wherein said resource comprises transceivers and said step of ascertaining an amount of a resource further comprises the steps of:
   determining a future number of traffic channels based on said future traffic level; and
   matching a number of installed transceivers to said future number of traffic channels prior to being able to observe a demand by subscribers in said wireless communications system for said future number of traffic channels.

10. The method according to claim 9, wherein said step of matching a number of installed transceivers further comprises the step of:
    ordering and installing a number of transceivers so that a specified grade of service is provided.

11. The method according to claim 7, wherein said step of applying further comprises the step of applying a third and a fourth entry, wherein said third entry includes a third time and a third value and said fourth entry includes a fourth time and a fourth value, said third value dependent on a third traffic level and said fourth value dependent on a fourth traffic level; and
    wherein said first entry, said second entry, said third entry, and said fourth entry are recorded at different times.

12. The method according to claim 7, wherein said step of determining at least one coefficient of said equation further comprises the step of using a Newton-Rapson iteration process to determine said at least one coefficient.

13. The method according to claim 7, wherein said first traffic level comprises a first mean traffic level and said second traffic level comprises a second mean traffic level, further comprising the steps of:
- determining a first busy hour traffic level for said first entry; and
- determining a second busy hour traffic level for said second entry.

14. The method according to claim 13, wherein the determination of a first mean traffic level for said first entry further comprises the steps of:
- accumulating a total traffic channel number over a predetermined time period at set intervals;
- accumulating a total number of said set intervals over said predetermined time period; and
- estimating said first mean traffic level from said total traffic channel number and said total number.

15. The method according to claim 13, wherein said step of determining a first busy hour traffic level for said first entry further comprises the step of:
- determining an average of a traffic level at a busy hour of each day during a predetermined period.

16. The method according to claim 7, wherein said equation is of the form:

$$f(t) = \frac{af_0}{bf_0 + (a - bf_0)e^{-a(t-t_0)}}$$

and wherein said step of determining at least one coefficient of said equation further comprises the steps of determining the a coefficient, determining the b coefficient, and determining the $f_0$ variable, wherein the $f_0$ variable is an initial traffic level.

17. The method according to claim 7, wherein said first traffic level is measured in Erlang.

18. A method in a wireless communications system for predicting future traffic levels, comprising the steps of:
- recording a first time for a first entry;
- determining a first value for said first entry, said first value dependent on a first traffic level;
- recording a second time for a second entry;
- determining a second value for said second entry, said second value dependent on a second traffic level;
- applying said first time, said first value, said second time, and said second value to an equation related to a growth model;
- determining at least one coefficient of said equation;
- predicting a future traffic level at a selected time using said equation with said at least one coefficient; and
- wherein said step of determining at least one coefficient of said equation further comprises the step of determining a plurality of coefficients of said equation.

19. The method according to claim 18, further comprising the step of determining a dividend of two of said plurality of coefficients of said equation, said dividend indicating an approximate maximum traffic level.

20. A method in a wireless communications system for predicting future traffic levels, comprising the steps of:
- recording a first time for a first entry;
- determining a first value for said first entry, said first value dependent on a first traffic level;
- recording a second time for a second entry;
- determining a second value for said second entry, said second value dependent on a second traffic level;
- applying said first time, said first value, said second time, and said second value to an equation related to a growth model;
- determining at least one coefficient of said equation;
- predicting a future traffic level at a selected time using said equation with said at least one coefficient; and
- wherein said first traffic level comprises a first mean traffic level and said second traffic level comprises a second mean traffic level, further comprising the steps of:
- determining a first busy hour traffic level for said first entry;
- determining a second busy hour traffic level for said second entry; and
- further comprising the step of:
- predicting a future busy hour traffic level based on combining said future traffic level with a maximum difference between each corresponding pair of mean traffic level and busy hour traffic level.

21. The method according to claim 20, further comprising the step of:
- ascertaining an amount of a resource, said amount of said resource accommodating said future busy hour traffic level.

22. A method in a wireless communications system for predicting future traffic levels, comprising the steps of:
- recording a first time for a first entry;
- determining a first value for said first entry, said first value dependent on a first traffic level;
- recording a second time for a second entry;
- determining a second value for said second entry, said second value dependent on a second traffic level;
- applying said first time, said first value, said second time, and said second value to an equation related to a growth model;
- determining at least one coefficient of said equation;
- predicting a future traffic level at a selected time using said equation with said at least one coefficient; and
- further comprising the step of:
- determining a current amount of a resource for said first entry.

23. The method according to claim 22, wherein said step of determining a current amount of a resource for said first entry further comprises the step of:
- determining a current number of installed transceivers.

24. A method in a wireless communications system for predicting future traffic levels, comprising the steps of:
- recording a first time for a first entry;
- determining a first value for said first entry, said first value dependent on a first traffic level;
- recording a second time for a second entry;
- determining a second value for said second entry, said second value dependent on a second traffic level;
- applying said first time, said first value, said second time, and said second value to an equation related to a growth model;
- determining at least one coefficient of said equation;
- predicting a future traffic level at a selected time using said equation with said at least one coefficient; and
- wherein said steps of determining at least one coefficient and predicting a future traffic level are performed at a mobile services switching center of said wireless communications system.

* * * * *

UNITED STATES PATENT AND TRADEMARK OFFICE
CERTIFICATE OF CORRECTION

PATENT NO. : 6,246,880 B1
DATED : June 12, 2001
INVENTOR(S) : Norio Iizuka

It is certified that error appears in the above-identified patent and that said Letters Patent is hereby corrected as shown below:

<u>Column 9,</u>
Line 1, replace "t approaches ¢ " with -- t approaches ∞ --

Signed and Sealed this

Twenty-sixth Day of March, 2002

Attest:

JAMES E. ROGAN
*Director of the United States Patent and Trademark Office*

*Attesting Officer*